US006263562B1

(12) United States Patent
Gosis et al.

(10) Patent No.: US 6,263,562 B1
(45) Date of Patent: Jul. 24, 2001

(54) MANUAL INSTALLATION TOOL FOR INSTALLING U-NUT FASTENERS

(75) Inventors: Anatoly Gosis, Palatine; Kenneth H. Dorman, Carol Stream, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/584,223

(22) Filed: May 31, 2000

(51) Int. Cl.[7] .......... B23Q 7/10
(52) U.S. Cl. .......... 29/809
(58) Field of Search .......... 29/809; 221/312 A, 221/312 R, 268, 279, 280

(56) References Cited

U.S. PATENT DOCUMENTS

| | | | | |
|---|---|---|---|---|
| 2,703,664 | * | 3/1955 | Rabkin et al. | 221/248 |
| 2,870,529 | * | 1/1959 | Erdmann | 221/312 A |
| 2,895,214 | * | 7/1959 | Erdmann | 221/312 A |
| 3,235,950 | * | 2/1966 | Smotzer, Jr. | 221/276 |
| 3,313,452 | * | 4/1967 | Katz | 221/268 |
| 3,402,454 | * | 9/1968 | Hartman et al. | 29/56.5 |
| 3,623,635 | * | 11/1971 | Erdman | 221/312 A |
| 3,748,717 | * | 7/1973 | Leffler et al. | 29/818 |
| 3,793,696 | * | 2/1974 | Barr et al. | 29/809 |
| 3,827,598 | * | 8/1974 | Erdman | 221/313 A |
| 4,189,062 | * | 2/1980 | Jackson | 221/312 A |
| 4,424,929 | * | 1/1984 | Weis | 227/32 |
| 4,485,952 | * | 12/1984 | Weis | 227/7 |
| 4,684,305 | | 8/1987 | Dubost . | |
| 4,729,706 | | 3/1988 | Peterson et al. . | |
| 4,793,753 | | 12/1988 | Muller et al. . | |
| 4,798,507 | | 1/1989 | Olah . | |
| 4,878,794 | | 11/1989 | Potucek . | |
| 5,039,264 | | 8/1991 | Benn . | |
| 5,294,224 | | 3/1994 | Kent . | |
| 5,713,707 | | 2/1998 | Gagnon . | |
| 5,881,452 | | 3/1999 | Nowell, III et al. | 29/816 |
| 6,023,833 | | 2/2000 | Jacobsmeier | 29/450 |

FOREIGN PATENT DOCUMENTS

| | | | | |
|---|---|---|---|---|
| 1728327 | * | 3/1972 | (DE) | B25B/27/00 |
| 1352776 | * | 5/1974 | (GB) | B25D/9/02 |
| 197705 | * | 5/1977 | (SU) | 29/809 |

* cited by examiner

*Primary Examiner*—S. Thomas Hughes
*Assistant Examiner*—Essama Omgba
(74) *Attorney, Agent, or Firm*—Schwartz & Weinrieb

(57) ABSTRACT

A U-nut type fastener installation tool, for installing individual U-nut fasteners from a vertically stacked, nested, or collated strip or array of such fasteners disposed within a magazine portion of the tool, comprises a base portion and the magazine portion which is pivotally mounted upon the base portion. The magazine portion also serves as an operator handle. A biasing spring within the magazine biases the collated strip of fasteners toward a dispensing position. When a fastener is to be dispensed and mounted upon an edge portion of a support plate or panel, the magazine-handle is tilted from its normal position by means of which movement a lowermost one of the fasteners is separated from the collated strip of fasteners remaining within the tool magazine. The tool is also substantially simultaneously moved toward the edge portion of the support panel or plate through means of a compound movement or motion whereby the lowermost fastener is able to be mounted upon the edge portion of the support plate or panel.

22 Claims, 3 Drawing Sheets

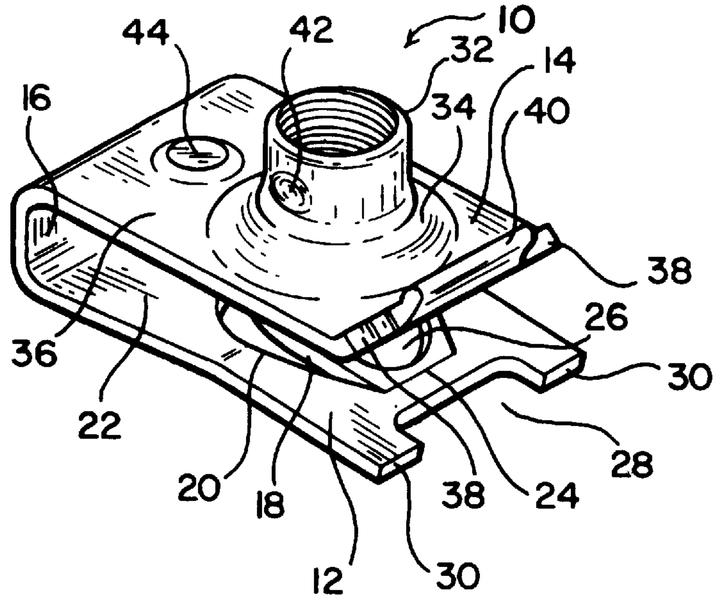
F/G. 1
F/G. 2
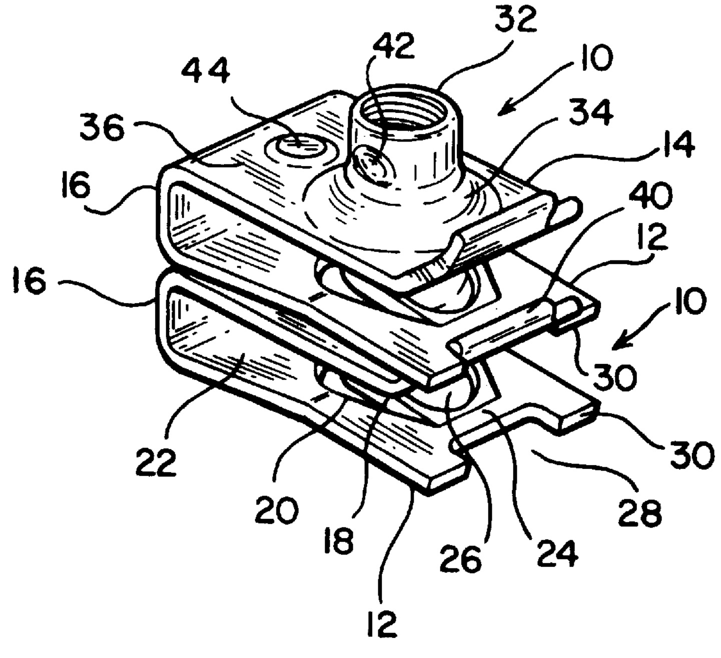

MANUAL INSTALLATION TOOL FOR INSTALLING U-NUT FASTENERS

FIELD OF THE INVENTION

The present invention relates generally to manual tools, and more particularly to a new and improved manual installation tool for installing U-nut type fasteners upon edge portions of panels, plates, or the like, wherein the installation tool is uniquely structured so as to permit a nested, stacked, or collated strip of U-nut fasteners to be accommodated within a magazine of the installation tool, and wherein further, the installation tool is able to separate individual fasteners from the vertical stack or collated strip of U-nut fasteners so as to serially apply the fasteners to edge portions of the mounting plates, panels, or the like.

BACKGROUND OF THE INVENTION

U-nuts are widely used as fasteners or support brackets within the automotive and other industries for mounting various components, such as, for example, modules, door panels, hinges, and the like, upon support panels, plates, beams, and the like. U-nut type fasteners conventionally comprise a U-shaped spring clip which has a flexibly resilient annular hoop or retainer ring, having a central aperture, partially sheared from a first one of the arms of the U-shaped spring clip, and an internally threaded sleeve or nut member which is integrally formed upon a second one of the arms of the U-shaped spring clip for threadedly receiving a threaded bolt or similar type fastener which is also passed through an aperture defined within the support plate or panel whereby the U-nut and bolt fasteners can be fixedly secured upon the support plate or panel so as to in turn secure one of the aforenoted components upon the support plate or panel. The second one of the arms of the U-shaped spring clip is also preferably provided with an upwardly bent forward edge or lip portion so as to facilitate insertion of an edge portion of the support panel or plate between the two arms of the U-nut.

U-nuts are thus mounted upon a support panel or plate by inserting, in effect, an edge portion of the support panel or plate into the space defined between the two arms of the U-nut fastener and subsequently sliding the U-nut fastener onto the support panel or plate until the flexibly resilient annular hoop or retainer ring engages and becomes seated within the aperture defined within the support panel or plate. The central aperture formed within the first one of the arms of the U-nut, and serving to define the annular hoop or retainer ring, also permits the passage therethrough of the bolt fastener, and still further, serves to somewhat guide the bolt fastener into engagement with the internally threaded sleeve or nut member formed upon the second one of the arms of the U-nut. Various types or various configurations of U-nut type fasteners are disclosed within U.S. Pat. No. 5,713,707 which issued to Gagnon on Feb. 3, 1998, U.S. Pat. No. 5,294,224 which issued to Kent on Mar. 15, 1994, U.S. Pat. No. 5,039,264 which issued to Benn on Aug. 13, 1991, U.S. Pat. No. 4,798,507 which issued to Olah on Jan. 17, 1989, U.S. Pat. No. 4,793,753 which issued to Muller et al. on Dec. 27, 1988, U.S. Pat. No. 4,729,706 which issued to Peterson et al. on Mar. 8, 1988, U.S. Pat. No. 4,684,305 which issued to Dubost on Aug. 4, 1987, and U.S. Pat. No. 3,426,818 which issued to Derby on Feb. 1, 1969. An installation tool for installing an individual U-nut type fastener upon a plate or panel is also disclosed within U.S. Pat. No. 4,793,753 which issued to Muller et al. on Dec. 27, 1988.

In connection with the sale and distribution of U-nut fasteners, the same are normally placed in storage bins in preparation for conveyance to packaging machinery, however, as can readily be appreciated, due to the unique structure of U-nut fasteners, the conventional storage of such fasteners usually results in the interlocking or entanglement of such fasteners. Such interlocking or entanglement of the fasteners prevents the efficient packaging of the fasteners, and in addition, inhibits the efficient and rapid use of such fasteners during installation procedures because, obviously, the interlocked or entangled fasteners must first be unlocked or disentangled from each other prior to use and installation of the same.

A need has therefore existed in the art for a new and improved U-nut type fastener which permits and facilitates the stacking or nesting of such fasteners into a collated strip whereby the fasteners can be packaged in a substantially improved and efficient manner, and for a new and improved collated strip of such fasteners wherein the fasteners can be readily disposed or oriented for disposition within the magazine of an installation tool such that the tool can apply the fasteners to edge portions of support plates or panels. The foregoing needs have now been met by means of a new and improved U-nut type fastener, and a vertically stacked or nested array of such fasteners, as disclosed within co-pending United States Patent application entitled U-NUT FASTENER AND COLLATED STRIP OF U-NUT FASTENERS, Application Ser. No. 09/583,704, filed on May 3, 2000. Nevertheless, as can be appreciated from the aforenoted patent to Muller et al., there has never been provided an installation tool which can accommodate a stacked, nested, or collated strip of U-nut type fasteners within, for example, a magazine portion of the tool, and which can then in effect separate individual fasteners from the nested, stacked, or collated array of fasteners so as to serially dispense such fasteners and therefore mount the same upon edge portions of support plates or panels.

A need therefore still exists in the art for an installation tool which can accommodate a stacked, nested, or collated strip of U-nut type fasteners within a magazine portion thereof, which is additionally able to easily remove or separate an individual one of the fasteners from the collated or nested strip of fasteners, and which is able to be utilized by operator personnel to rapidly install such separated U-nut type fasteners upon edge portions of support plates, panels, or the like.

OBJECTS OF THE INVENTION

Accordingly, it is an object of the present invention to provide a new and improved tool for installing U-nut type fasteners upon edge portions of support plates or panels.

Another object of the present invention is to provide a new and improved tool for installing U-nut type fasteners which effectively overcomes the various drawbacks or disadvantages characteristic of PRIOR ART U-nut type fastener installation tools.

An additional object of the present invention is to provide a new and improved tool for installing U-nut type fasteners wherein the tool can house a nested, stacked, or collated array of U-nut type fasteners within the tool magazine.

A further object of the present invention is to provide a new and improved installation tool which is uniquely structured for removing or separating individual U-nut fasteners from the nested or collated strip of fasteners and for installing the separated U-nut fastener upon an edge portion of a support plate or panel.

SUMMARY OF THE INVENTION

The foregoing and other objectives are achieved in accordance with the teachings and principles of the present invention through the provision of a new and improved tool for installing U-nut type fasteners wherein a vertically nested, stacked, or collated array of such fasteners is able to be housed within a magazine portion of the tool. The magazine portion of the tool also serves as an operator handle by means of which the tool is able to be grasped and manipulated by operator personnel. The magazine-handle portion of the tool is also pivotally mounted upon a head portion of the tool within which an endmost one of the U-nut fasteners is disposed as a result of the vertically nested, stacked, or collated strip being biased toward the dispensing station or position by means of a spring member.

When the endmost one of the U-nut fasteners is to, in effect, be dispensed and mounted upon, for example, an edge portion of a support plate or panel, the operator grasps the handle-magazine portion of the tool and tilts the same in a direction opposite from the direction in which the endmost U-nut fastener is to be dispensed or moved onto the edge portion of the support plate or panel. This tilting of the magazine-handle portion of the tool serves to initially separate the endmost U-nut fastener from the remaining U-nut fasteners disposed within the tool magazine-handle, and in conjunction with such tilting movement or motion, the head portion of the tool, which now has the single and separated endmost U-nut fastener disposed therein, is in effect moved toward the support plate or panel upon which the endmost U-nut fastener is to be mounted. Once the endmost U-nut fastener is in effect dispensed from the head portion of the installation tool and mounted upon the edge portion of the support plate or panel, the handle-magazine portion of the installation tool is permitted to move back to its non-tilted home or initial position, which movement is assisted by means of a second biasing spring mechanism interconnecting the handle-magazine portion of the tool to the head portion of the tool, whereby the biasing spring of the magazine is now able to force the collated strip of U-nut fasteners toward the head portion of the tool whereby the next endmost U-nut fastener is now disposed within the head portion of the installation tool in preparation for a new U-nut fastener installation operation.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 1 is a perspective view of a U-nut type fastener which is of the type which is able to be nested, stacked, or collated together with other U-nut type fasteners having the same structure so as to form a nested, stacked, or collated strip of U-nut fasteners which is able to be incorporated within the magazine of the new and improved installation tool constructed in accordance with the teachings and principles of the present invention for dispensing and mounting such U-nut fasteners upon edge portions of a support plate or panel;

FIG. 2 is a perspective view of a pair of U-nut type fasteners, as disclosed within FIG. 1, wherein the pair of U-nut type fasteners are disclosed in a vertically stacked or nested array which is particularly adaptable for use within the magazine of the new and improved installation tool constructed in accordance with the teachings and principles of the present invention for applying individual ones of the U-nut fasteners to edge portions of support plates or panels;

DETAILED DESCRIPTION OF THE PREFERRED EMBODIMENT

Figure 4:
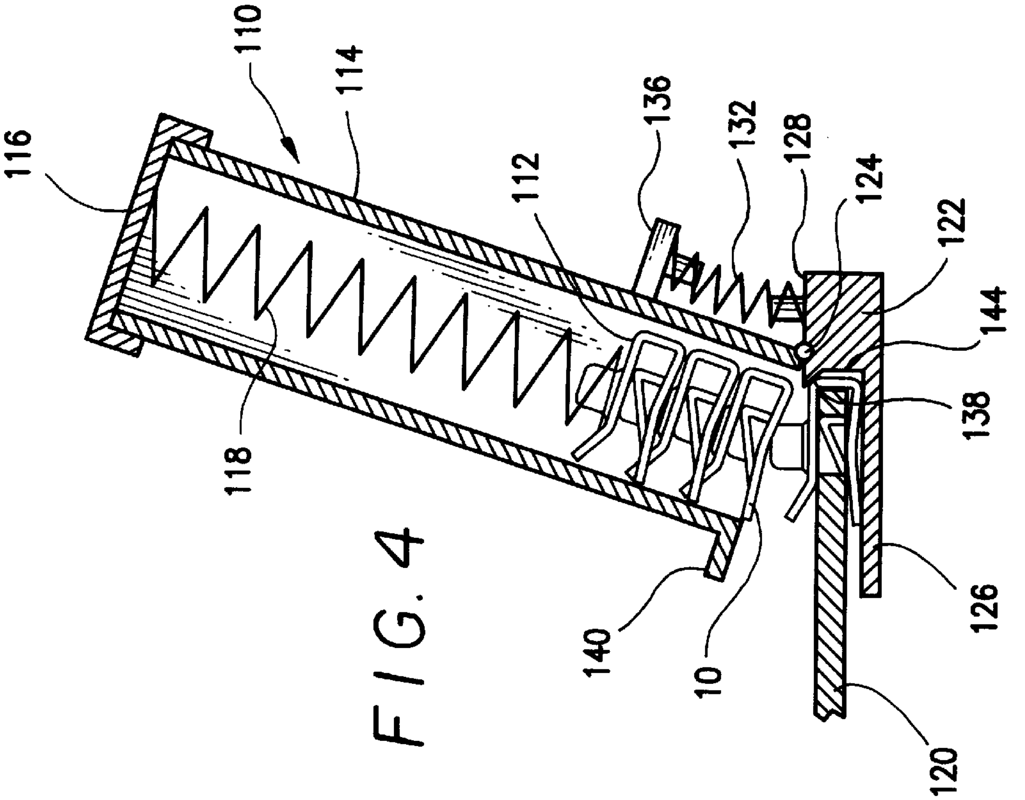
FIG. 4 is a cross-sectional schematic view similar to that of FIG. 3 showing, however, the disposition, state, mode, or orientation of the installation tool when the same is actually being used for separating the endmost one of the U-nut fasteners from the collated strip of fasteners and for applying the separated fastener to an edge portion of a support plate or panel.

Referring now to the drawings, and more particularly to FIG. 1 thereof, a U-nut type fastener of the type which is adapted to be dispensed and mounted upon an edge portion of a support plate or panel, by means of the new and improved installation tool constructed in accordance with the principles and teachings of the present invention and as will be disclosed and discussed more in detail hereinafter, is disclosed and is generally indicated by the reference character 10. As is apparent, the U-nut fastener 10 is seen to comprise a first lower arm member 12, a second upper arm member 14, and an intermediate folded bite portion 16 integrally interconnecting the first and second arm members 12, 14 such that the overall fastener 10 has a substantially U-shaped configuration with the first and second lower and upper arms 12,14 disposed substantially parallel to each other. The fastener 10 can be fabricated by means of suitable extrusion or stamping operations from a sheet metal blank, and it is further seen that the first lower arm member 12 has integrally formed therewith an annular hoop member or retainer ring 18 which is partially severed as at 20 from a main or primary arm portion 22 of first lower arm member 12 such that the annular hoop member or retainer ring 18 is flexibly and integrally connected to the main or primary arm portion 22 of first lower arm member 12 by means of a hinge portion 24. The annular hoop member or retainer ring 18 has a central aperture 26 defined therein, and is normally disposed in an inclined mode at a predetermined angle with respect to the main or primary arm portion 22 for engaging an aperture defined within an edge portion of a sup-port plate or panel when the U-nut fastener 10 is mounted upon an edge portion of the support plate or panel. Lastly, the first lower arm member 12 is also provided with a recessed cut-out region 28 which is defined within the free end or forward edge portion 30 so as to assist the proper or desired stacking or nesting of a plurality of the U-nut fasteners when forming a vertical array of the U-nut fasteners for packaging and use within the installation tool of the present invention.

The second upper arm member 14 is provided with an internally threaded, upwardly projecting sleeve or nut member 32 which is substantially axially aligned with the aperture 26 defined within the annular hoop member or retainer ring 18 so as to accommodate a threaded bolt fastener, not shown, which is adapted to be passed through an aperture defined within the support plate or panel upon which the U-nut fastener 10 and the component, also not shown, are to be mounted. A frusto-conical portion 34 integrally connects the lower end portion of the sleeve or nut member 32 to an upper surface region of a main or primary arm portion 36 of second upper arm member 14 so as to properly distribute the threaded load onto the support plate or panel, not shown. The second upper arm member 14 is also provided at its free end or forward edge portion 38 with an upwardly inclined latch projection 40 which is adapted to mate with the recessed cutout portion 28 of the first lower arm member 12 when a plurality of U-nut fasteners 10 are nested or collated together in a vertically stacked array for packaging purposes as well as for magazine loading within the installation tool of the present invention.

With reference now being made to FIG. 2, a pair of U-nut fasteners 10,10 are shown in their relative positions when nested or stacked together in a vertical array so as to disclose the various structural features characteristic of the U-nut fastener 10 and to additionally illustrate how such structural features of the U-nut fasteners 10 enable the U-nut fasteners 10 to be stacked or nested in a vertical array so as to form a stacked or nested array of U-nut fasteners 10 for advantageous packaging of the fasteners as well as magazine loading of the same within the installation tool of the present invention.

In order to form the stacked array of U-nut fasteners as disclosed within FIG. 2, it is to be appreciated that the internal diametrical extent of the annular hoop member or retainer ring 18 is substantially the same as the external diametrical extent of the upstanding sleeve or nut member 32. The annular hoop member or retainer ring 18, however, is somewhat resiliently flexible, and consequently, when a first upper one of the U-nut fasteners 10 is disposed atop a second lower one of the U-nut fasteners 10 so as to form the vertically stacked or nested array of the U-nut fasteners 10,10, the annular hoop member or retainer ring 18 of the first upper one of the U-nut fasteners 10,10 flexes or expands radially outwardly somewhat so as to accommodate the upstanding sleeve or nut member 32 of the second lower one of the U-nut fasteners 10,10 whereby the U-nut fasteners 10,10 are effectively locked together. In order to in fact ensure or enhance such locking together of the stacked or nested U-nut fasteners 10,10, it is further seen that each one of the upstanding sleeve or nut member 32 of each one of the U-nut fasteners 10,10 is provided with a pair of detents or indentations 42 upon diametrically opposite sides of the upstanding sleeve or nut member 32. It is noted that each detent or indentation 42 has a substantially elliptical or oval-shaped configuration and that the major axis of the elliptical or oval-shaped detent or indentation 42 is inclined with respect to the horizontal whereby such major axis is disposed at an angular inclination which substantially matches the inclination of the annular hoop member or retainer ring 18. In this manner, the plane of the annular hoop member or retainer ring 18 is in effect aligned with the major axis of the detent or indentation 42 whereupon the side portions of the annular hoop member or retainer ring 18 will be properly seated within or engaged with the detents or indentations 42.

When the pair of U-nut fasteners 10,10 are disposed in the illustrated vertically stacked or nested array, it is further noted that the upwardly inclined latch projection 40 of the lower one of the U-nut fasteners 10,10 is engaged within the recessed or cut-out edge portion 28 of the upper one of the U-nut fasteners 10 while the forwardly projecting edge portions 30,30 of the upper one of the U-nut fasteners 10 rest upon or engage the forward edge portions 38,38 of the lower one of the U-nut fasteners 10. This engagement or disposition of such structure serves two purposes. The interengagement of the latch projection 40 of the lower U-nut fastener 10 with the recessed or cut-out portion 28 of the upper U-nut fastener 10 prevents relative pivotal or rotational movement of the fasteners 10,10 with respect to each other whereby the fasteners 10,10 will in effect remain in their vertically aligned stacked array. In addition, the interengagement of the forward edge portions 30,30 of the upper one of the U-nut fasteners 10 with the forward edge portions 38,38 of the lower one of the U-nut fasteners 10 serves to maintain the fasteners 10,10 in a substantially horizontally parallel mode.

As a further and last feature of the U-nut fastener 10 of the type with which the installation tool of the present invention is concerned, and in conjunction with the aforenoted structure for maintaining the stacked or nested fasteners 10,10 in a substantially parallel disposition or orientation, it is also seen that a dimple 44 is provided upon a rearwardly disposed upper surface portion of the upper arm member 14. As can be appreciated, when the fasteners 10,10 are nested or stacked, the dimple 44 of a lower one of the fasteners 10 engages an undersurface portion of the lower arm member 12 of an upper one of the fasteners 10 such that the rear end portions of the stacked or nested U-nut fasteners 10,10 are maintained in a spaced relationship with respect to each other whereby the aforenoted desired parallel mode or orientation of the fasteners 10,10 is achieved. It is noted still further that such spacing between such rear portions of the stacked or nested fasteners 10,10 also serves to permit a component of an installation tool to be inserted within such space so as to in effect separate, for example, the lowermost one of the fasteners 10 from the vertical stack or array of fasteners 10 disposed, for example, within a magazine of the installation tool, whereby individual fasteners 10 can be applied to edge portions of a support plate or panel as will be discussed shortly hereinafter. It is also noted that when a particular fastener 10 is slidably mounted upon an edge portion of the support panel or plate which, as has been noted hereinbefore, is provided with an aperture for permitting a bolt fastener, not shown, to be inserted therethrough, the flexibly resilient annular hoop member or retainer ring 18 will be snap-fitted into such support plate or panel aperture so as to properly seat the fastener 10 upon the support plate or panel.

Figure 3:
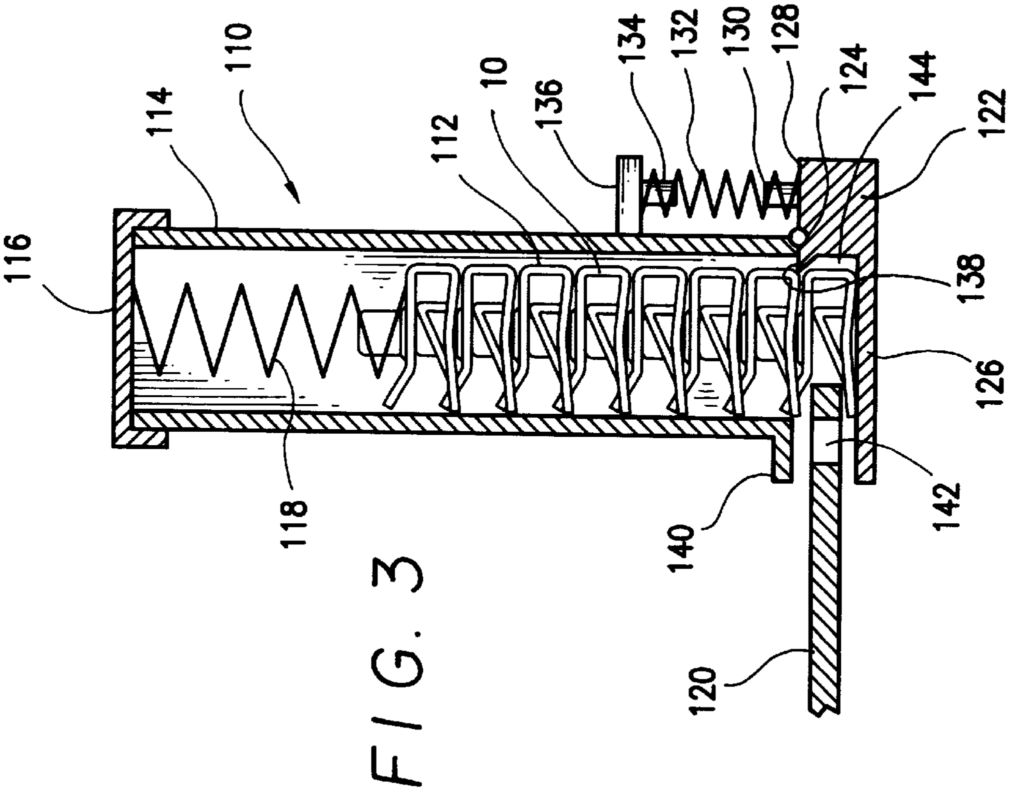
FIG. 3 is a cross-sectional schematic view of a first embodiment of a new and improved U-nut type fastener installation tool constructed in accordance with the teachings and principles of the present invention and showing the cooperative parts thereof disposed in its mode, disposition, state, or orientation just prior to the commencement of a fastener installation operation.

With reference now being made to FIGS. 3 and 4, a first embodiment of an installation tool, constructed in accordance with the principles and teachings of the present invention, is disclosed and is generally indicated by the reference character 110. As has been alluded to hereinbefore, the installation tool 110 is adapted to house a stacked, nested, or collated strip of the U-nut fasteners 10,10 as shown in FIG. 2, and as now shown in FIGS. 3 and 4, it is of course seen that the nested, stacked, or collated strip 112 of U-nut fasteners 10 obviously comprises more than just two of the fasteners 10,10 as shown in FIG. 2 which simply disclosed two of the fasteners 10,10 for illustrative purposes in order to show or illustrate the interengaging structural details of the fasteners 10 when the same are stacked, nested, or collated atop one another.

In view of the fact that each one of the U-nut fasteners 10 has an overall configuration which is substantially rectangular, the installation tool 110 comprises, as viewed in FIGS. 3 and 4, an upstanding magazine 114 which also has a substantially rectangular configuration and within which the stacked, nested, or collated strip 112 of U-nut fasteners 10 is adapted to be disposed. Both of the upper and lower opposite ends of the magazine 114 are open, with the opening in the lower end facilitating the loading of a collated strip 112 of fasteners 10 into the magazine 114, while the upper end of the magazine is closed by means of a suitable cap 116. A coil spring member 118 is interposed between an interior surface of the end cap 116 and the upper end of the collated strip 112 of fasteners 10 so as to bias the collated strip 112 of fasteners 10 downwardly toward the lower open end of the magazine 114 whereby the fasteners 10 can be dispensed and mounted upon an edge portion of a support plate or panel 120 as will be discussed more fully hereinafter.

The lower end of the magazine 114 is pivotally mounted upon a head or base member 122 by means of a suitable hinge mechanism 124 which permits the magazine 114 to be moved, for example, between a first disposition or state as shown in FIG. 3 wherein the magazine 114 is oriented or disposed at such position prior to the installation tool 110 being used to dispense and mount a U-nut fastener 10 upon the support plate or panel 120, and a second disposition or state as shown in FIG. 4 wherein the magazine 114 is oriented or disposed during the fastener dispensing and mounting operation. It is additionally noted that when, for example, the magazine 114 is tilted to a position beyond that disclosed in FIG. 4, such permits or facilitates the loading of a new collated strip 112 of fasteners 10 into the magazine 114. The head or base member 122 is seen to have a substantially stepped configuration wherein the lower part of the stepped portion comprises in effect a support shelf or platform 126 which effectively closes the lower end of the magazine 114 and also serves to support the stack or collated strip of fasteners 112 with a lowermost one of the U-nut fasteners 10 actually resting upon the support shelf or platform 126 in preparation or readiness for the dispensing and mounting of the same onto the edge portion of the support plate or panel 120. The upper part of the stepped head or base member 122 is provided with an upper surface 128 upon which the hinge mechanism 124 is mounted, and it is noted that the depth of the step defined between such upper surface 128 and the support shelf or platform 126 corresponds to the depth of each fastener 10.

In addition, upper surface 128 also has mounted thereon a lower stub, axle, or trunnion 130 upon which a lower end of a coil spring 132 is mounted. An upper stub, axle, or trunnion 134 is mounted upon a support bracket 136 which, in turn, is fixedly mounted upon a lower external side wall portion of the magazine 114, and the upper end of the coil spring 132 is mounted upon the upper stub, axle, or trunnion 134. In this manner, the coil spring 132 is able to normally bias the magazine 114 toward its first upstanding position as shown in FIG. 3. It is also seen that the upper surface portion 128 of the stepped member 122 is additionally provided with a wedge-shaped member 138 which, as can be readily appreciated from a comparison of FIGS. 3 and 4, is adapted to, in effect, be inserted between the upper surface of the lowermost U-nut fastener 10 and the lower surface of the second lowest U-nut fastener 10 so as to cooperate in the separation of the lowermost fastener 10 from the other fasteners 10 remaining in the collated stack 112 of fasteners in preparation for mounting of the lowermost fastener 10 onto the edge portion of the support plate or panel 120.

Accordingly, when it is desired to mount one of the U-nut fasteners 10 upon an edge portion of the support plate or panel 120, the installation tool 110, having its magazine 114 filled with a collated strip 112 of the U-nut fasteners 10, is positioned adjacent to the edge portion of the support plate or panel 120 as shown in FIG. 3. A lower external side wall portion of the magazine 114, which is disposed upon an opposite side of the magazine 114 from the hinge mechanism 124, is provided with an alignment device or pointer 140 which may take the form of an arrowhead. As is known in the art, the support plate or panel 120 is also provided with an aperture 142 through which a bolt fastener, not shown, is adapted to be passed so as to secure the U-nut fastener 10, and an associated component, also not shown, and which is to be mounted upon the support plate or panel 120, upon the support plate or panel 120. Consequently, when the installation tool 110 is maneuvered toward the support plate or panel 120 in preparation for the dispensing and mounting of one of the U-nut fasteners 10 onto the edge portion of the support plate or panel 120, the arrowhead pointer 140 is used to properly align the tool 110 with the aperture 142 of the support panel or plate 120 such that when the U-nut fastener 10 is dispensed from the magazine 114, the annular hoop member or retainer ring 18 of the fastener 10 will be properly aligned with the aperture 142 of the support plate or panel 120 whereby the hoop member or ring 18 can be seated within the aperture 142 so as to properly seat and mount the fastener 10 upon the support plate or panel 120.

Once the installation tool 110 has been positioned adjacent to the support plate or panel 120 as disclosed in FIG. 3, the magazine portion 114 is grasped by means of the installation operator, such that the magazine portion 114 of the tool 110 serves as a manipulative handle, and pivoted with respect to the base member 122 to the position shown in FIG. 4. As a result of such pivotal movement of the magazine-handle portion 114 relative to the base member 122, the upper fasteners 10 disposed within the collated strip 112 of fasteners are effectively begun to be separated from the lowermost U-nut fastener 10. In addition, in conjunction with such pivotal movement of the magazine-handle portion 114 of the tool 110, the lower base portion 122 of the tool 110 is simultaneously moved toward the support panel or plate 120 in accordance with a compound motion or movement whereby the wedge member 138 effectively completes the separation of the lowermost fastener 10 from the collated strip 112 of fasteners. It can be appreciated that the separated lowermost fastener 10 is now effectively grasped or disposed within a socket region 144, defined by means of the support shelf or platform 126, base member 122, and wedge member 138, whereby the base member 122 can now cause the separated lowermost fastener 10 to be moved toward and mounted upon the edge portion of the support plate or panel 120. Once the fastener 10 is mounted upon the support plate or panel 120, the handle-magazine 114 may be tilted back toward its original upright position as shown in FIG. 3 in preparation for a new fastener installation cycle or operation wherein the coil spring 118 biases a new lowermost fastener 10 into engagement with the support shelf or platform 126 of the base member 122.

Figure 6:
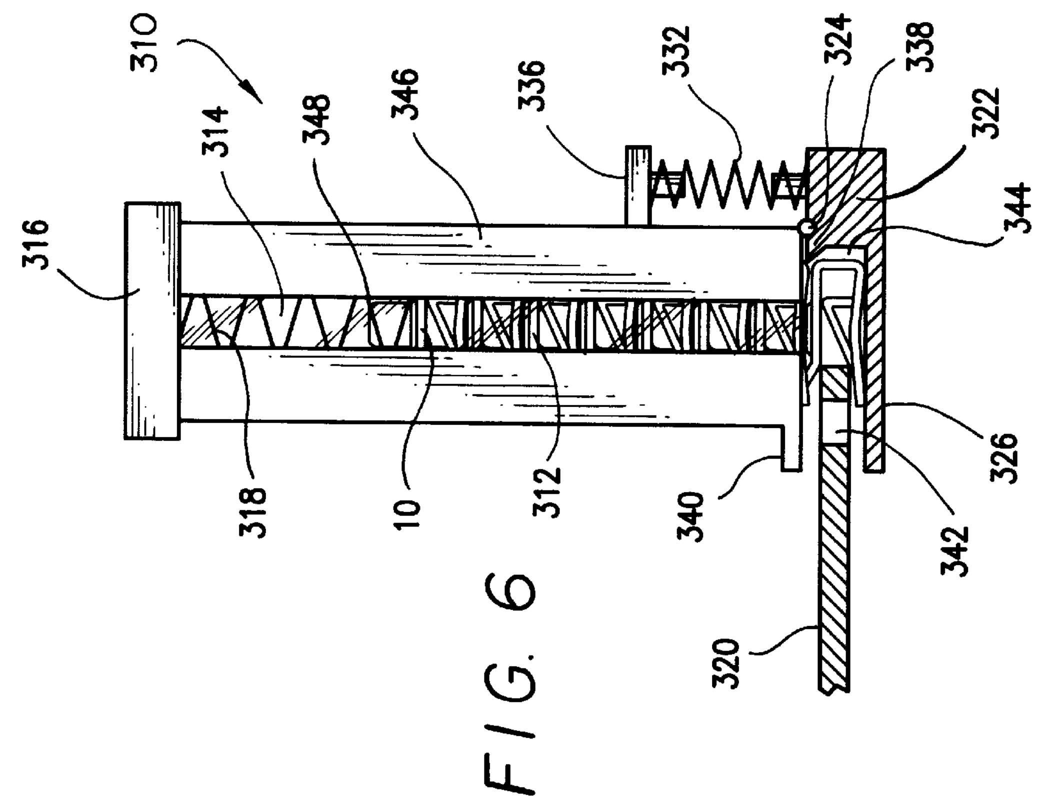
FIG. 6 is a schematic side elevational view, similar to that of FIG. 5 showing, however, a third embodiment of a new and improved U-nut type fastener installation tool constructed in accordance with the teachings and principles of the present invention and showing the cooperative parts thereof disposed in its mode, disposition, state, or orientation just prior to the commencement of a fastener installation operation.
Figure 5:
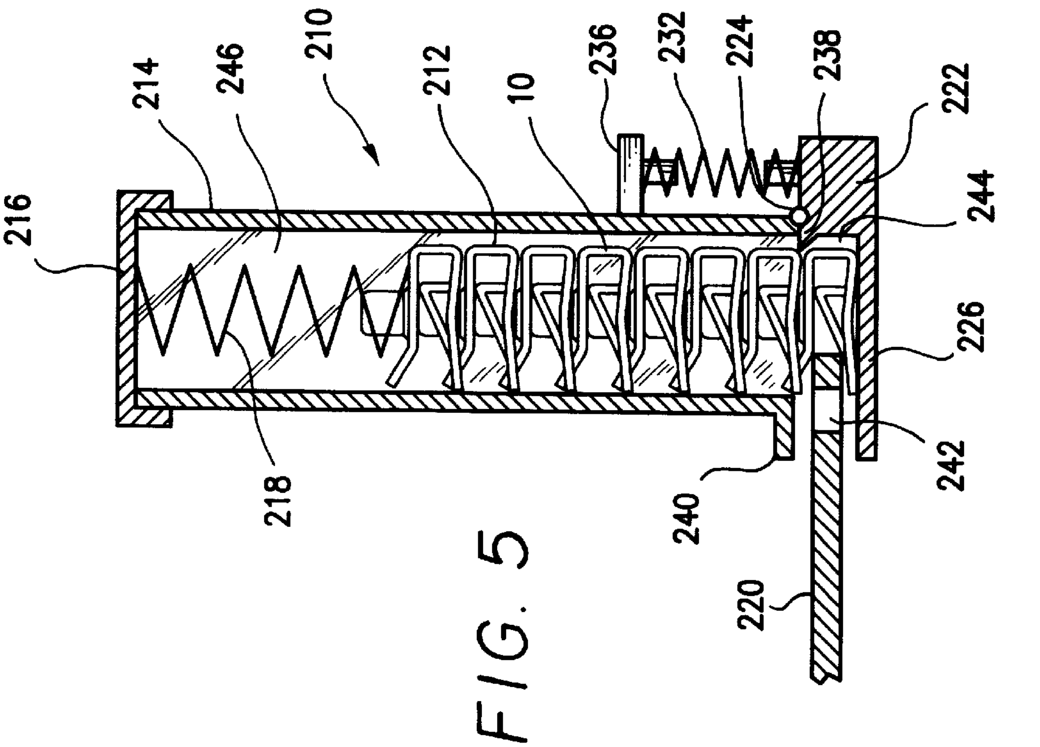
FIG. 5 is a schematic side elevational view of a second embodiment of a new and improved U-nut type fastener installation tool constructed in accordance with the teachings and principles of the present invention and showing the cooperative parts thereof disposed in its mode, disposition, state, or orientation just prior to the commencement of a fastener installation operation.

With reference now being made to FIGS. 5 and 6, second and third modified embodiments of the installation tool 110 are disclosed and are generally indicated respectively by means of reference characters 210 and 310. The installation tools 210 and 310 are identical to the installation tool 110 in connection with all of its operative modes, and consequently, a detailed description of such installation tools 210,310 will not be described. In addition, the major structural components of the tools 210,310 which correspond to similar structural components of the tool 110 have accordingly been designated by corresponding reference characters except that the reference characters for the tools 210,310 are within the 200 and 300 series. The only significant difference between the installation tool 210 and the installation tool 110 resides in the fact that a side wall portion 246 is made transparent such that an operator can readily determine the supply of U-nut fasteners 10 which remain available for installation within the fastener magazine 214. In a similar manner, the only significant difference between the installation tool 310 and the installation tools 110,210 resides in the fact that, in lieu of the transparent side wall 246 of the second embodiment tool 210, a vertically oriented transparent window 348 is provided within a side wall portion 346 of the installation tool 310 so as to similarly provide the operator personnel with a visual indication of the level of the U-nut fasteners 10 within the magazine 314.

Thus, it may be seen that in accordance with the teachings and principles of the present invention, a new and improved U-nut type fastener installation tool has been developed wherein the fasteners are arranged within a vertically nested or stacked array or magazine within the tool, and wherein further, the tool can easily and readily separate such fasteners and install the same upon edge portions of the support plates or panels. The tool magazine includes a biasing spring for biasing the stacked or collated strip of fasteners toward a dispensing position, and the tool magazine also serves as a handle which may be pivoted from an initial position to an operative position at which the lowermost fastener is able to be separated from the collated strip of fasteners and forced onto an edge portion of a support plate or panel through means of a compound movement or motion of the handle-magazine.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. An installation tool for serially installing individual fasteners upon a support member, comprising:

a base member;

a magazine for housing a plurality of fasteners within a stacked array; and means movably mounting said magazine upon said base member between a first position at which said base member can support the stacked array of fasteners disposed within said magazine, and a second position at which all of the plurality of stacked fasteners, except for an endmost one of the fasteners of the stacked array of fasteners disposed within said magazine, are separated from the endmost one of the fasteners disposed within said magazine such that the endmost one of the fasteners remains supported upon said base member in preparation for the installation of the endmost one of the fasteners upon the support member.

2. The installation tool as set forth in claim 1, wherein:

said magazine comprises a pointer for facilitating alignment of said tool with a predetermined portion of the support member such that the endmost fastener is installed at a predetermined location upon the support member.

3. The installation tool as set forth in claim 2, wherein:

each one of said fasteners comprises a U-nut type fastener.

4. The installation tool as set forth in claim 3, wherein:

each one of said U-nut type fasteners comprises a first lower arm member comprising a retainer ring, and a second upper arm member comprises an upstanding nut portion such that a retainer ring of an upper one of said plurality of stacked fasteners disposed within said magazine is lockingly retained upon an upstanding nut portion of a lower one of said plurality of stacked fasteners.

5. The installation tool as set forth in claim 1, wherein:

said base member has a stepped configuration for seating the endmost one of the plurality of fasteners in preparation for mounting of the endmost one of the fasteners upon the support member.

6. The installation tool as set forth in claim 5, wherein:

said stepped configuration of said base member has a predetermined depth dimension for corresponding to that of each one of the plurality of fasteners such that only a single one of the plurality of fasteners can be seated upon said base member in preparation for installation upon the support member.

7. The installation tool as set forth in claim 1, wherein:

said magazine is pivotally mounted upon said base member.

8. The installation tool as set forth in claim 1, further comprising:

a spring member disposed internally within said magazine for biasing the plurality of fasteners disposed within said magazine toward said base member.

9. The installation tool as set forth in claim 1, wherein:

one side wall of said magazine is transparent so as to visually permit an operator to determine the number of fasteners remaining within said magazine.

10. The installation tool as set forth in claim 1, wherein:

one side wall of said magazine comprises a transparent window portion so as to visually permit an operator to determine the number of fasteners remaining within said magazine.

11. The installation tool as set forth in claim 1, wherein:

said base member comprises a wedge member for insertion between the endmost one of the fasteners and the plurality of fasteners remaining within said magazine when said magazine is disposed at said second position so as to facilitate separation of the endmost one of the fasteners from the plurality of fasteners remaining within said magazine.

12. The installation tool as set forth in claim 1, wherein:

a spring member interconnects said magazine and said base member for biasing said magazine toward said first position.

13. An installation tool for serially installing individual fasteners upon a support member, comprising:

a base member;

a magazine;

a plurality of fasteners disposed within said magazine in a stacked array; and means movably mounting said magazine upon said base member between a first position at which said base member supports said stacked array of fasteners disposed within said magazine, and a second position at which all of said plurality of stacked fasteners, except for an endmost one of said fasteners of said stacked array of fasteners disposed within said magazine, are separated from said endmost one of said fasteners disposed within said magazine such that said endmost one of said fasteners remains supported upon said base member in preparation for the installation of said endmost one of said fasteners upon the support member.

14. The installation tool as set forth in claim 13, wherein:

said base member has a stepped configuration for seating the endmost one of the plurality of fasteners in preparation for mounting of the endmost one of the fasteners upon the support member.

15. The installation tool as set forth in claim 14, wherein:

said stepped configuration of said base member has a predetermined depth dimension for corresponding to that of each one of the plurality of fasteners such that only a single one of the plurality of fasteners can be seated upon said base member in preparation for installation upon the support member.

16. The installation tool as set forth in claim 13, wherein:

said magazine is pivotally mounted upon said base member.

17. The installation tool as set forth in claim 13, further comprising:

a spring member disposed internally within said magazine for biasing the plurality of fasteners disposed within said magazine toward said base member.

18. The installation tool as set forth in claim 13, wherein:

one side wall of said magazine is transparent so as to visually permit an operator to determine the number of fasteners remaining within said magazine.

19. The installation tool as set forth in claim 13, wherein:

one side wall of said magazine comprises a transparent window portion so as to visually permit an operator to determine the number of fasteners remaining within said magazine.

20. The installation tool as set forth in claim 13, wherein:

said base member comprises a wedge member for insertion between the endmost one of the fasteners and the plurality of fasteners remaining within said magazine when said magazine is disposed at said second position so as to facilitate separation of the endmost one of the fasteners from the plurality of fasteners remaining within said magazine.

21. The installation tool as set forth in claim 13, wherein:

a spring member interconnects said magazine and said base member for biasing said magazine toward said first position.

22. The installation tool as set forth in claim 13, wherein:

said magazine comprises a pointer for facilitating alignment of said tool with a predetermined portion of the support member such that the endmost fastener is installed at a predetermined location upon the support member.

* * * * *